United States Patent
Tsai

(10) Patent No.: US 6,650,553 B2
(45) Date of Patent: Nov. 18, 2003

(54) ISOLATED SWITCHING POWER SUPPLY HAVING VOLT-SECOND CLAMPING CIRCUIT

(75) Inventor: Kuei-Hsiang Tsai, Jungli (TW)

(73) Assignee: Delta Electronics Inc., Taoyuan (TW)

( * ) Notice: Subject to any disclaimer, the term of this patent is extended or adjusted under 35 U.S.C. 154(b) by 0 days.

(21) Appl. No.: 10/194,585

(22) Filed: Jul. 12, 2002

(65) Prior Publication Data

US 2003/0012043 A1 Jan. 16, 2003

(30) Foreign Application Priority Data

Jul. 13, 2001 (TW) ........................................ 90117243 A

(51) Int. Cl.$^7$ ............................................. H02M 3/335
(52) U.S. Cl. ................................ 363/21.07; 363/21.15; 363/21.1
(58) Field of Search ........................... 363/21.07, 21.15, 363/21.1, 21.18

(56) References Cited

U.S. PATENT DOCUMENTS

| | | | |
|---|---|---|---|
| 5,576,941 A | * | 11/1996 | Nguyen et al. .......... 363/21.07 |
| 6,088,244 A | * | 7/2000 | Shioya et al. ............ 363/21.07 |
| 6,125,046 A | * | 9/2000 | Jang et al. ............... 363/21.15 |
| 6,188,587 B1 | * | 2/2001 | Yun et al. ................ 363/21.18 |
| 6,396,718 B1 | * | 5/2002 | Ng et al. ................. 363/21.07 |
| 6,434,026 B1 | * | 8/2002 | Malik et al. ............. 363/21.14 |
| 6,577,511 B2 | * | 6/2003 | Yamaguchi et al. ..... 363/21.07 |
| 6,583,994 B2 | * | 6/2003 | Clayton et al. .......... 363/21.18 |

* cited by examiner

*Primary Examiner*—Bao Q. Vu
(74) *Attorney, Agent, or Firm*—Haverstock & Owens LLP

(57) ABSTRACT

An isolated switching-mode power supply with a volt-second clamp circuit is provided. A control circuitry for an isolated switching-mode power supply includes a transformer having a primary winding electrically connected to voltage supply terminals and a secondary winding for providing an output voltage, a volt-second clamp circuit electrically connected to the primary winding for controlling conduction and non-conduction states of the primary winding so as to achieve a maximum volt-second product limit of an input voltage at the primary winding, and a voltage feedback controller electrically connected to the volt-second clamp circuit for generating a feedback signal with reference to a magnitude of the output voltage and then modulating the volt-second product of the input voltage at the primary winding to stabilize the output voltage.

9 Claims, 5 Drawing Sheets

ISOLATED SWITCHING POWER SUPPLY HAVING VOLT-SECOND CLAMPING CIRCUIT

FIELD OF THE INVENTION

The present invention relates to switching-mode power supplies, and especially to an isolated switching power supply having a volt-second clamping circuit.

BACKGROUND OF THE INVENTION

FIG. 1 illustrates a typical isolated switching power supply. Please refer to FIG. 1. A typical control circuitry for an isolated switching-mode power supply includes a transformer 1, a pulse width modulated (PWM) generator 2, a voltage feedback controller 3, and a metal oxide semiconductor field effect transistor (MOSFET) 4. The transformer 1 has a primary winding electrically connected to voltage supply terminals $V_{in}$ and a secondary winding for providing an output voltage. The voltage feedback controller 3 is electrically connected to output terminals of the isolated switching power supply and generates a feedback signal with reference to the output voltage of the isolated switching power supply. The feedback signal is fed into the pulse width modulated generator 2 to modulate the duty cycle of the PWM signal thereof. The PWM signal is utilized to control conduction and non-conduction states of the metal oxide semiconductor field effect transistor (MOSFET) 4 to stabilize the output voltage if there are variations at the output voltages due to the load effect or there are variations at the input voltages. However, the duty cycle of the PWM signal in the typical isolated switching power supply is greatly increased so large due to the great increase of the load in the typical isolated switching power supply or the startup condition that the transformer 1 goes into saturation and the metal oxide semiconductor field effect transistor 4 may be destroyed. The typical solution is to increase the primary number of turns or enlarge the transformer core. But this way offers disadvantages including the increase of cost and the weight of the isolated switching power supply.

It is therefore attempted by the applicant to deal with the above situation encountered with the prior art.

SUMMARY OF THE INVENTION

It is therefore an object of the present invention to propose an isolated switching power supply having a volt-second clamping circuit to provide a stable output voltage and avoid the saturation of the transformer. Furthermore, according to the present invention, the volume of the transformer in the isolated switching power supply can be reduced and the damage to the primary-side switching element can be avoided.

According to an aspect of the present invention, the control circuitry for an isolated switching-mode power supply includes a transformer having a primary winding electrically connected to voltage supply terminals and a secondary winding for providing an output voltage, a volt-second clamp circuit electrically connected to the primary winding for controlling conduction and non-conduction states of the primary winding so as to achieve a maximum volt-second product limit of an input voltage at the primary winding, and a voltage feedback controller electrically connected to the volt-second clamp circuit for generating a feedback signal with reference to a magnitude of the output voltage and then modulating the volt-second product of the input voltage at the primary winding to stabilize the output voltage.

Preferably, the volt-second clamp circuit includes a sawtooth wave generator for providing a sawtooth wave that increases linearly as a function of time with a slope which is proportional to a supply voltage, a pulse width modulated (PWM) generator for providing a pulse width modulated signal, a diode with its cathode end electrically connected to an output terminal of the pulse width modulated (PWM) generator and its anode end electrically connected to an output terminal of the sawtooth wave generator, a comparator having a noninverting terminal electrically connected to a first voltage level, and an inverting terminal electrically connected to the output terminal of the sawtooth wave generator, a first transistor switch with a control electrode electrically connected to the output terminal of the comparator, a first conduction electrode electrically connected to the output terminal of the pulse width modulated (PWM) generator, and a second conduction electrode electrically connected to ground, a toem-pole circuit with its input terminal electrically connected to the first conduction electrode, and a second transistor switch with a control electrode electrically connected to an output terminal of the toem-pole circuit, a first conduction electrode electrically connected to one terminal of the primary winding, and a second conduction electrode electrically the other terminal of the voltage supply terminals.

Preferably, the first transistor switch is a bipolar junction transistor (BJT).

Preferably, the second transistor switch is a metal oxide semiconductor field effect transistor (MOSFET).

Preferably, the sawtooth wave generator includes a resistor having one end electrically connected to the voltage supply terminal, and a capacitor having one end electrically connected to the other end of the resistor to form a node that is the output terminal of the sawtooth wave generator, and the other end electrically connected to ground.

Preferably, the voltage feedback controller further includes a photo-coupler for providing an isolated protection and feeding the volt-second clamp circuit the feedback signal.

Preferably, the volt-second clamp circuit includes a pulse width modulated (PWM) generator for providing a pulse width modulated signal, a peak holding circuit electrically connected to one end of the secondary winding for obtaining a voltage, a sawtooth wave generator electrically connected to an output terminal of the peak holding circuit for providing a sawtooth wave that increases linearly as a function of time with a slope which is proportional to the supply voltage, a diode with its anode end electrically connected to an output terminal of the sawtooth wave generator, and its cathode end electrically connected to an output terminal of the pulse width modulated generator for being turned on when the pulse width modulated signal is at a low level voltage and turned off when the pulse width modulated signal is at a high level voltage so that the sawtooth wave generator outputs the sawtooth wave when the pulse width modulated signal is at the high level voltage, a comparator having an inverting terminal electrically connected a voltage level, and a noninverting terminal electrically connected to an output terminal of the sawtooth wave generator, a first transistor switch having a control electrode electrically connected to the output terminal of the comparator, a first conduction electrode electrically connected to ground, and a second conduction electrode electrically connected to the output terminal of the pulse width modulated generator, a toem-pole circuit with an input terminal electrically connected the second conduction electrode of the first transistor switch, an isolated transformer having a secondary winding electrically connected to an output terminal of the toem-pole circuit, and a second transistor switch having a control electrode electrically connected to one end of a primary winding of the isolated transformer, a first conduction electrode electrically connected to the other end of the primary winding of the isolated transformer, and a second conduction electrode electrically connected to one end of the primary winding of the transformer.

Preferably, the peak holding circuit includes a first diode having an anode end electrically connected to one end of the secondary winding of the transformer, and a first capacitor having one end electrically connected to a cathode end of the first diode for forming a node which is the output terminal of the peak holding circuit, and the other end electrically connected to ground.

Preferably, the sawtooth wave generator includes a resistor having one end electrically connected to the output terminal of the peak holding circuit, and a capacitor having one end electrically connected to the other end of the resistor to form a node that is the output terminal of the sawtooth wave generator, and the other end electrically connected to ground.

The present invention may best be understood through the following description with reference to the accompanying drawings, in which:

DETAILED DESCRIPTION OF THE PREFERRED EMBODIMENT

Figure 1:
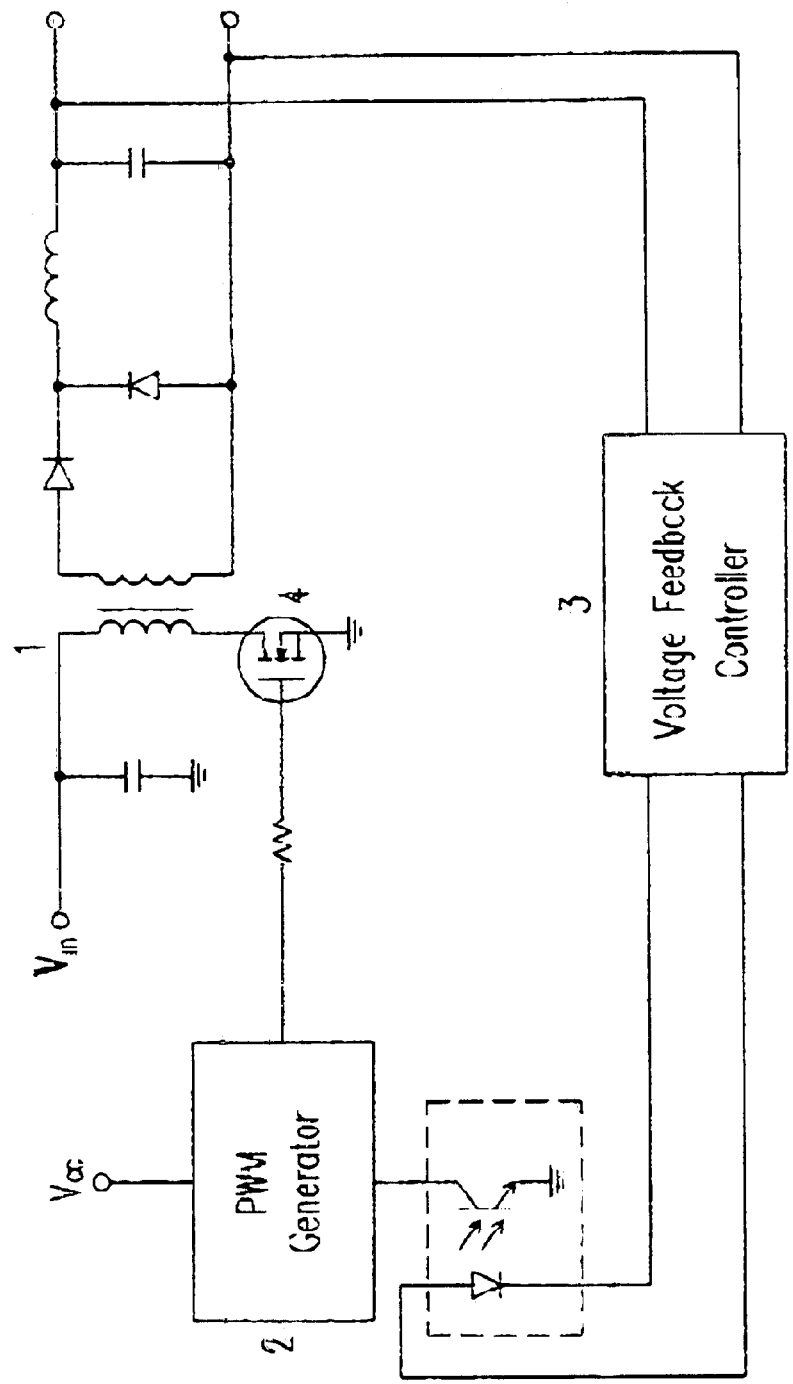
FIG. 1 illustrates a typical isolated switching power supply.
Figure 2A:
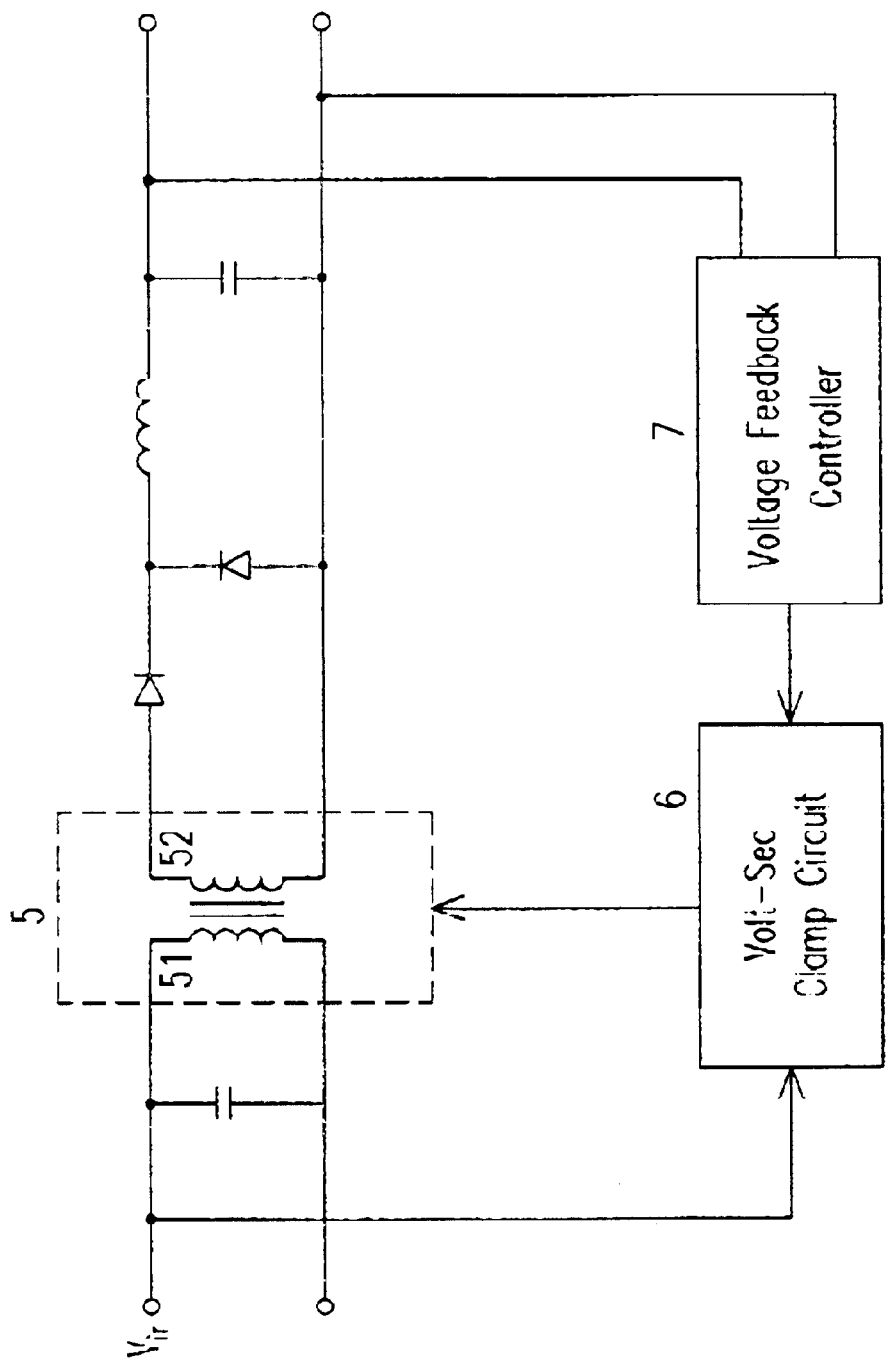
FIG. 2(a) is a block diagram illustrating an isolated switching power supply with a volt-second clamp circuit according to a first preferred embodiment of the present invention.

FIG. 2(a) is a block diagram illustrating an isolated switching power supply with a volt-second clamp circuit according to a first preferred embodiment of the present invention. As shown in FIG. 2(a), the control circuitry for an isolated switching-mode power supply includes a transformer 5, a volt-second clamp circuit 6, and a voltage feedback controller 7. The transformer 5 has a primary winding 51 electrically connected to voltage supply terminals $V_{in}$ and a secondary winding 52 for providing an output voltage. The volt-second clamp circuit 6 is electrically connected to the primary winding 51 for controlling conduction and non-conduction states of the primary winding 51 so as to achieve a maximum volt-second product limit of an input voltage at the primary winding 51. And, the voltage feedback controller 7 is electrically connected to the volt-second clamp circuit 6 for generating a feedback signal with reference to a magnitude of the output voltage and then modulating the volt-second product of the input voltage at the primary winding 51 to stabilize the output voltage.

Figure 2B:
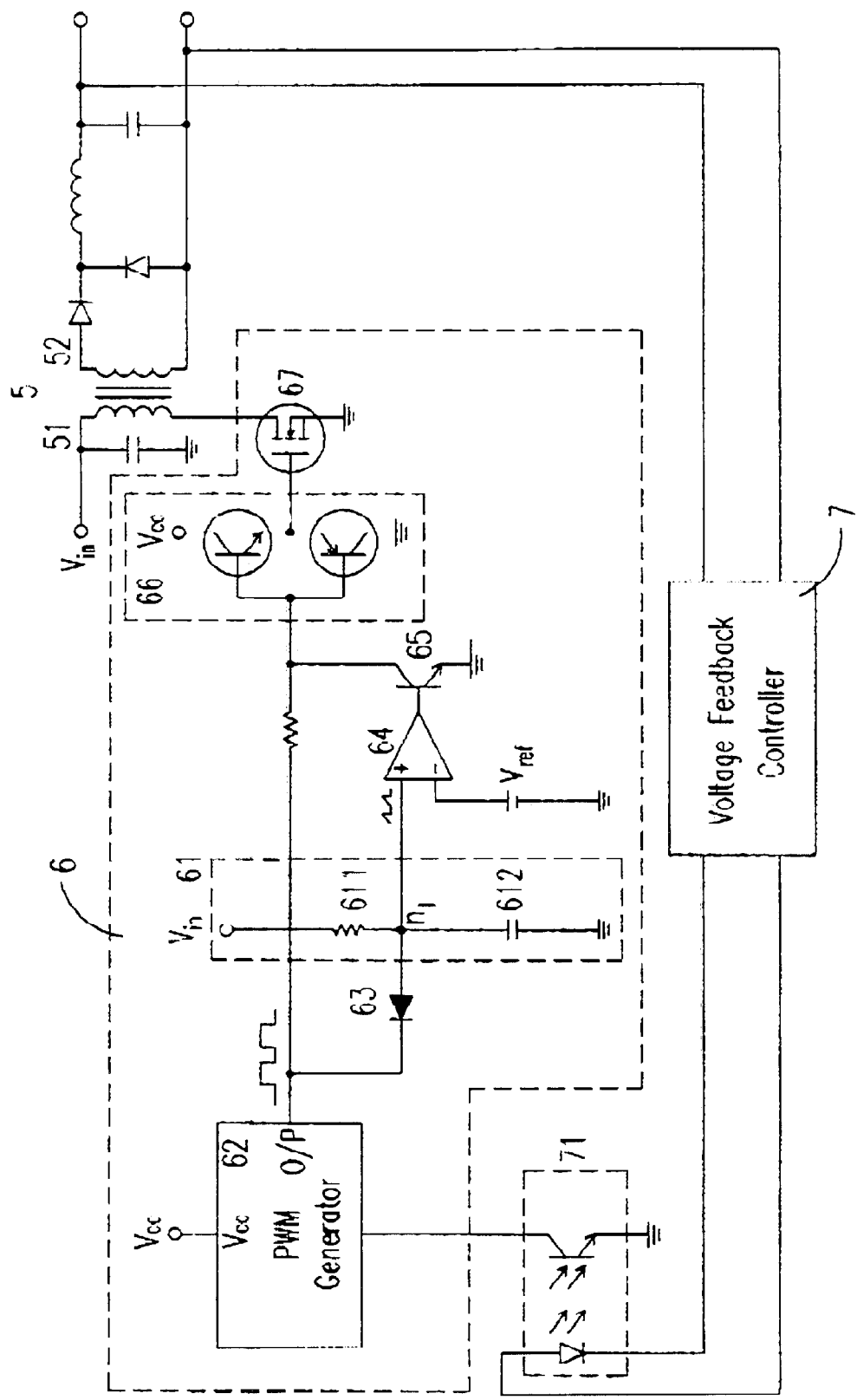
FIG. 2(b) is a schematic diagram illustrating an isolated switching power supply with a volt-second clamp circuit according to a first preferred embodiment of the present invention.

FIG. 2(b) is a schematic diagram illustrating an isolated switching power supply with a volt-second clamp circuit according to a first preferred embodiment of the present invention. As shown in FIG. 2(b), the volt-second clamp circuit 6 includes a sawtooth wave generator 61, a pulse width modulated (PWM) generator 62, a diode 63, a comparator 64, a bipolar junction transistor (BJT) 65, a toem-pole circuit 66, and a metal oxide semiconductor field effect transistor (MOSFET) 67. The sawtooth wave generator 61 provides a sawtooth wave that increases linearly as a function of time with a slope which is proportional to a supply voltage. The pulse width modulated (PWM) generator 62 provides a pulse width modulated signal. The diode 63 with its cathode end is electrically connected to an output terminal of the pulse width modulated (PWM) generator 62 and its anode end is electrically connected to an output terminal of the sawtooth wave generator 61. The comparator 64 has a noninverting terminal electrically connected to a first voltage level $V_{ref}$, and an inverting terminal electrically connected to the output terminal of the sawtooth wave generator 61. The bipolar junction transistor (BJT) 65 has a base electrode electrically connected to the output terminal of the comparator 64, a collector electrode electrically connected to the output terminal of the pulse width modulated (PWM) generator 62, and a emitter electrode electrically connected to ground. The toem-pole circuit 66 has its input terminal electrically connected to the collector electrode of the bipolar junction transistor 65. And, the metal oxide semiconductor field effect transistor (MOSFET) 67 has a gate electrode electrically connected to an output terminal of the toem-pole circuit, a drain electrode electrically connected to one terminal of the primary winding 51, and a source electrode electrically the other terminal of the voltage supply terminals $V_{in}$. Meanwhile, the sawtooth wave generator 61 includes a resistor 611 having one end electrically connected to the voltage supply terminal $V_{in}$, and a capacitor 612 having one end electrically connected to the other end of the resistor 611 to form a node $n_1$ that is the output terminal of the sawtooth wave generator 61, and the other end electrically connected to ground. Additionally, the voltage feedback controller 7 further includes a photo-coupler 71 for providing an isolated protection and feeding the volt-second clamp circuit 6 the feedback signal.

Figure 3A:
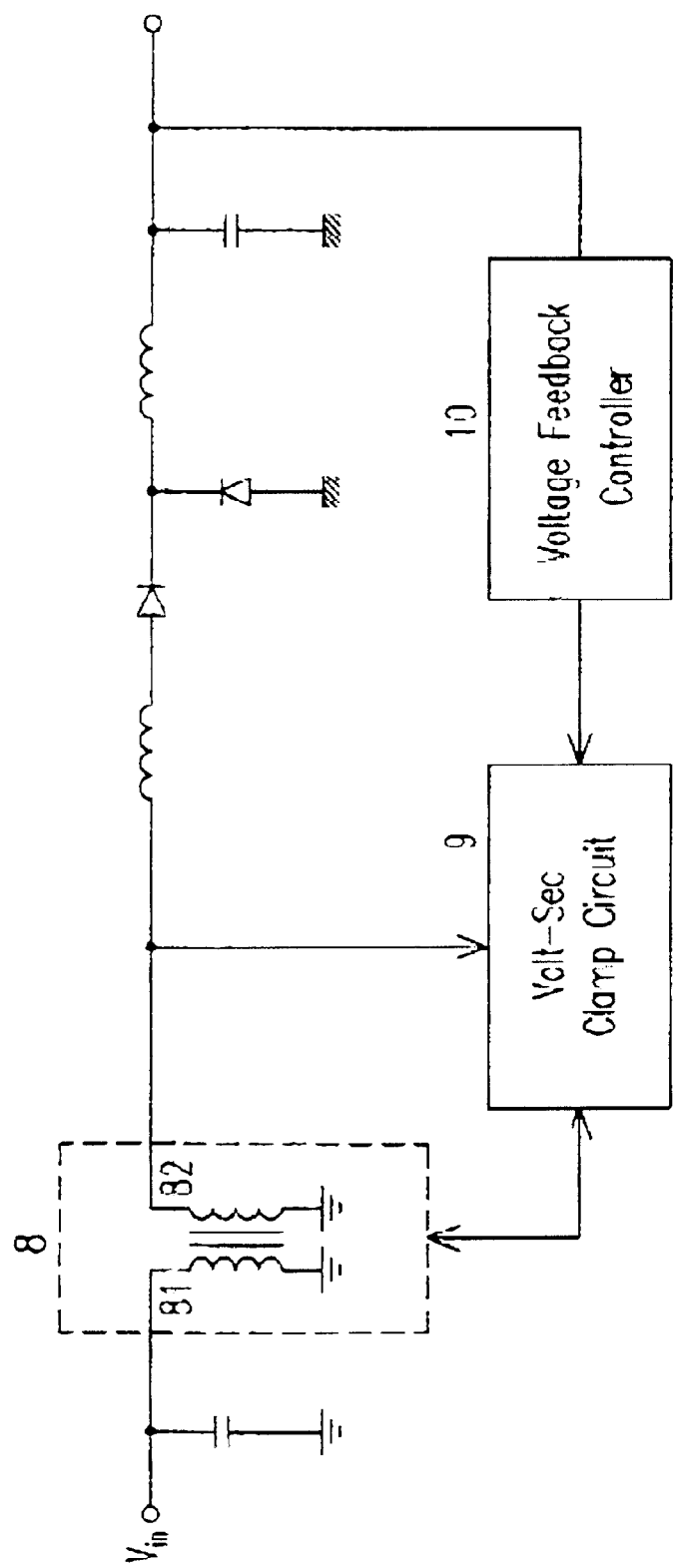
FIG. 3(a) is a block diagram illustrating an isolated switching power supply with a volt-second clamp circuit according to a second preferred embodiment of the present invention.

FIG. 3(a) is a block diagram illustrating an isolated switching power supply with a volt-second clamp circuit according to a second preferred embodiment of the present invention. As shown in FIG. 3(a), the control circuitry for an isolated switching-mode power supply includes a transformer 8, a volt-second clamp circuit 9, and a voltage feedback controller 10. The transformer 8 has a primary winding 81 electrically connected to voltage supply terminals $V_{in}$ and a secondary winding 82 for providing an output voltage. The volt-second clamp circuit 9 is electrically connected to the primary winding 81 for controlling conduction and non-conduction states of the primary winding 81 so as to achieve a maximum volt-second product limit of an input voltage at the primary winding 81. And, the voltage feedback controller 10 is electrically connected to the volt-second clamp circuit 9 for generating a feedback signal with reference to a magnitude of the output voltage and then modulating the volt-second product of the input voltage at the primary winding 81 to stabilize the output voltage.

Figure 3B:
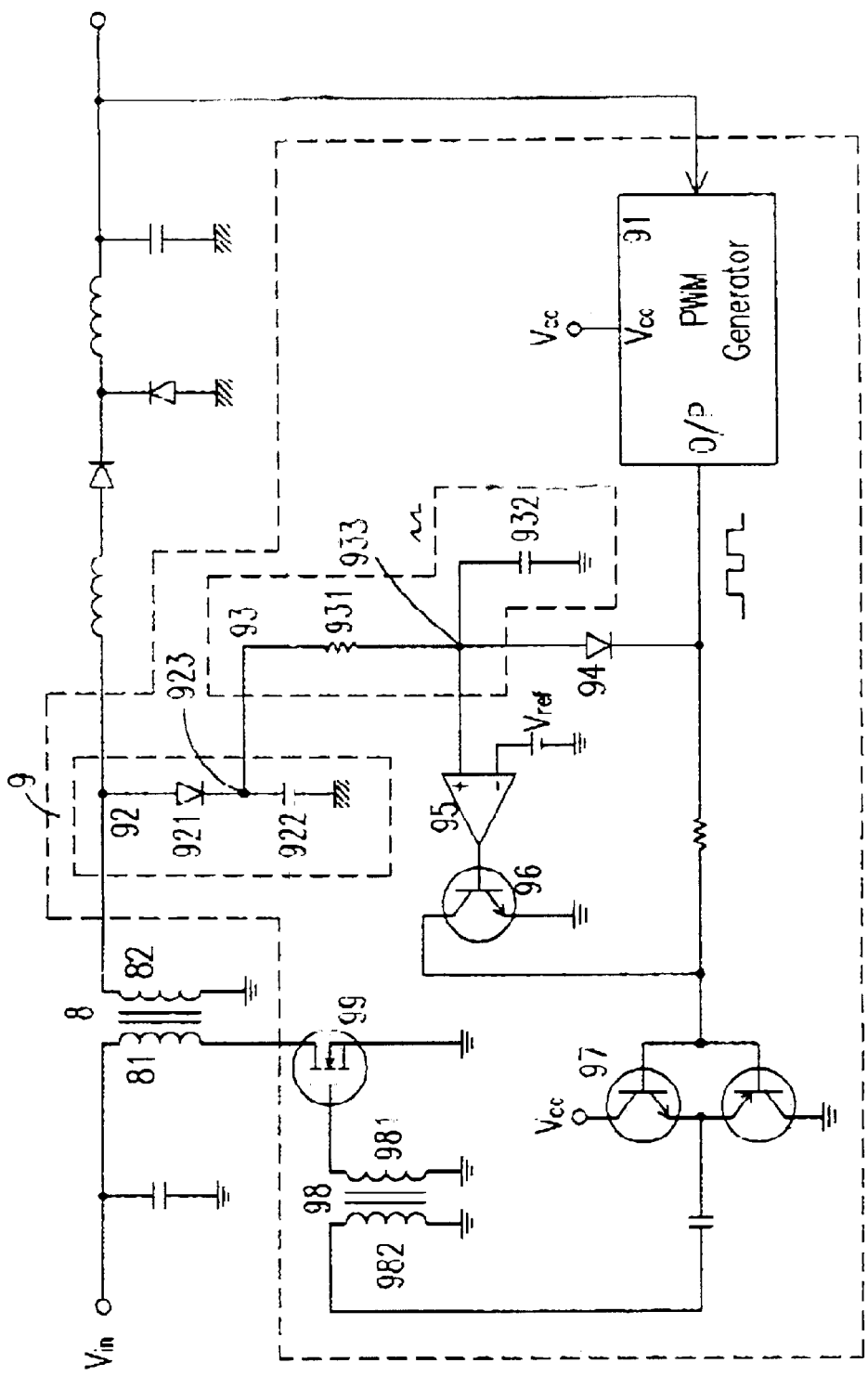
FIG. 3(b) is a schematic diagram illustrating an isolated switching power supply with a volt-second clamp circuit according to a second preferred embodiment of the present invention.

FIG. 3(b) is a schematic diagram illustrating an isolated switching power supply with a volt-second clamp circuit according to a second preferred embodiment of the present invention. As shown in FIG. 3(b), the volt-second clamp circuit 9 includes a pulse width modulated (PWM) generator 91, a peak holding circuit 92, a sawtooth wave generator 93, a diode 94, a comparator 95, a bipolar junction transistor (BJT) 96, a toem-pole circuit 97, an isolated transformer 98, and a metal oxide semiconductor field effect transistor (MOSFET) 99. The pulse width modulated (PWM) generator 91 provides a pulse width modulated signal. The peak holding circuit 92 is electrically connected to one end of the secondary winding 82 for obtaining a voltage. The sawtooth wave generator 93 is electrically connected to an output terminal of the peak holding circuit 92 for providing a sawtooth wave that increases linearly as a function of time with a slope which is proportional to the supply voltage. The diode 94 has its anode end electrically connected to an output terminal of the sawtooth wave generator 93, and its cathode end electrically connected to an output terminal of the pulse width modulated generator 91 for being turned on when the pulse width modulated signal is at a low level voltage and turned off when the pulse width modulated signal is at a high level voltage so that the sawtooth wave generator 93 outputs the sawtooth wave when the pulse width modulated signal is at the high level voltage. The comparator 95 has an inverting terminal electrically connected a voltage level $V_{ref}$, and a noninverting terminal electrically connected to an output terminal of the sawtooth wave generator 93. The bipolar junction transistor (BJT) 96 has a base electrode electrically connected to the output terminal of the comparator 95, a first emitter electrode electrically connected to ground, and a collector electrode electrically connected to the output terminal of the pulse width modulated generator 91. The toem-pole circuit 97 has an input terminal electrically connected the collector electrode of the bipolar junction transistor. The isolated transformer 98 has a secondary winding 982 electrically connected to an output terminal of the toem-pole circuit 97. And, a metal oxide semiconductor field effect transistor (MOSFET) 99 has a gate electrode electrically connected to one end of a primary winding 981 of the isolated transformer 98, a source electrode electrically connected to the other end of the primary winding 981 of the isolated transformer 98, and a drain electrode electrically connected to one end of the primary winding 81 of the transformer 8. Preferably, the peak holding circuit 92 includes a first diode 921 having an anode end electrically connected to one end of the secondary winding 82 of the transformer 8, and a first capacitor 922 having one end electrically connected to a cathode end of the first diode 921 for forming a node 923 which is the output terminal of the peak holding circuit 92, and the other end electrically connected to ground. Additionally, the sawtooth wave generator 93 includes a resistor 931 and a capacitor 932. The resistor 931 has one end electrically connected to the output terminal of the peak holding circuit 92. And, a capacitor 932 has one end electrically connected to the other end of the resistor 931 to form a node 933 that is the output terminal of the sawtooth wave generator 93, and the other end electrically connected to ground.

However, the duty cycle of the PWM signal in the typical isolated switching power supply needs to be greatly increased due to the great increase of the load in the typical isolated switching power supply or the startup condition. Because of the function of the volt-second clamp circuit, the duty cycle can be limited to a maximum value. Therefore, through the volt-second clamp circuit, the primary winding can be controlled on conduction and non-conduction states so as to achieve a maximum volt-second product limit of an input voltage at the primary winding. Consequently, the transformer won't go into saturation and the switching element may not be damaged under the increase of load and the startup conditions. By this way the circuitry offers advantages including the decrease of cost and the weight of the isolated switching power supply.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control circuitry for an isolated switching-mode power supply, comprising:

a transformer having a primary winding electrically connected to voltage supply terminals and a secondary winding for providing an output voltage; and a volt-second clamp circuit electrically connected to said primary winding for controlling conduction and non-conduction states of said primary winding so as to achieve a maximum volt-second product limit of an input voltage at said primary winding; and a voltage feedback controller electrically connected to said volt-second clamp circuit for generating a feedback signal with reference to a magnitude of said output voltage and then modulating said volt-second product of said input voltage at said primary winding to stabilize said output voltage.

2. The control circuitry according to claim 1, wherein said volt-second clamp circuit comprises:

a sawtooth wave generator for providing a sawtooth wave that increases linearly as a function of time with a slope which is proportional to a supply voltage;

a pulse width modulated (PWM) generator for providing a pulse width modulated signal;

a diode with its cathode end electrically connected to an output terminal of said pulse width modulated (PWM) generator and its anode end electrically connected to an output terminal of said sawtooth wave generator;

a comparator having a noninverting terminal electrically connected to a first voltage level, and an inverting terminal electrically connected to said output terminal of said sawtooth wave generator;

a first transistor switch with a control electrode electrically connected to said output terminal of said comparator, a first conduction electrode electrically connected to said output terminal of said pulse width modulated (PWM) generator, and a second conduction electrode electrically connected to ground;

a toem-pole circuit with its input terminal electrically connected to said first conduction electrode; and a second transistor switch with a control electrode electrically connected to an output terminal of said toem-pole circuit, a first conduction electrode electrically connected to one terminal of said primary winding, and a second conduction electrode electrically the other terminal of said voltage supply terminals.

3. The control circuitry according to claim 2, wherein said first transistor switch is a bipolar junction transistor (BJT).

4. The control circuitry according to claim 2, wherein said second transistor switch is a metal oxide semiconductor field effect transistor (MOSFET).

5. The control circuitry according to claim 2, wherein said sawtooth wave generator comprises:
- a resistor having one end electrically connected to said voltage supply terminal; and
- a capacitor having one end electrically connected to the other end of said resistor to form a node that is said output terminal of said sawtooth wave generator, and the other end electrically connected to ground.

6. The control circuitry according to claim 2, wherein said voltage feedback controller further comprises a photocoupler for providing an isolated protection and feeding said volt-second clamp circuit said feedback signal.

7. The control circuitry according to claim 1, wherein said volt-second clamp circuit comprises:
- a pulse width modulated (PWM) generator for providing a pulse width modulated signal;
- a peak holding circuit electrically connected to one end of said secondary winding for obtaining a voltage;
- a sawtooth wave generator electrically connected to an output terminal of said peak holding circuit for providing a sawtooth wave that increases linearly as a function of time with a slope which is proportional to said supply voltage;
- a diode with its anode end electrically connected to an output terminal of said sawtooth wave generator, and its cathode end electrically connected to an output terminal of said pulse width modulated generator for being turned on when said pulse width modulated signal is at a low level voltage and turned off when said pulse width modulated signal is at a high level voltage so that said sawtooth wave generator outputs said sawtooth wave when said pulse width modulated signal is at said high level voltage;
- a comparator having an inverting terminal electrically connected a voltage level, and a noninverting terminal electrically connected to an output terminal of said sawtooth wave generator;
- a first transistor switch having a control electrode electrically connected to said output terminal of said comparator, a first conduction electrode electrically connected to ground, and a second conduction electrode electrically connected to said output terminal of said pulse width modulated generator;
- a toem-pole circuit with an input terminal electrically connected said second conduction electrode of said first transistor switch;
- an isolated transformer having a secondary winding electrically connected to an output terminal of said toem-pole circuit; and
- a second transistor switch having a control electrode electrically connected to one end of a primary winding of said isolated transformer, a first conduction electrode electrically connected to the other end of said primary winding of said isolated transformer, and a second conduction electrode electrically connected to one end of said primary winding of said transformer.

8. The control circuitry supply according to claim 7, wherein said peak holding circuit comprises:
- a first diode having an anode end electrically connected to one end of said secondary winding of said transformer; and
- a first capacitor having one end electrically connected to a cathode end of said first diode for forming a node which is said output terminal of said peak holding circuit, and the other end electrically connected to ground.

9. The control circuitry supply according to claim 7, wherein said sawtooth wave generator comprises:
- a resistor having one end electrically connected to said output terminal of said peak holding circuit; and
- a capacitor having one end electrically connected to the other end of said resistor to form a node that is said output terminal of said sawtooth wave generator, and the other end electrically connected to ground.

* * * * *